US005754554A

United States Patent [19]

Nakahara

[11] Patent Number: 5,754,554
[45] Date of Patent: May 19, 1998

[54] TELEPHONE APPARATUS FOR MULTIPLEXING DIGITAL SPEECH SAMPLES AND DATA SIGNALS USING VARIABLE RATE SPEECH CODING

[75] Inventor: Toru Nakahara, Tokyo, Japan

[73] Assignee: NEC Corporation, Tokyo, Japan

[21] Appl. No.: 550,106

[22] Filed: Oct. 30, 1995

[30] Foreign Application Priority Data

Oct. 28, 1994  [JP]  Japan ................................. 6-289113

[51] Int. Cl.$^6$ ............................................................. H04J 3/00
[52] U.S. Cl. ........................... 370/498; 370/336; 370/435;
 379/59; 395/2
[58] Field of Search ............................. 370/528, 435,
 370/498, 334, 336, 418, 471; 379/56, 57,
 58, 59, 63; 395/2, 2.21

[56] References Cited

U.S. PATENT DOCUMENTS

| 4,813,040 | 3/1989 | Futato ................................ 370/528 |
| 5,022,024 | 6/1991 | Paneth et al. ...................... 370/334 |
| 5,079,762 | 1/1992 | Tanabe .............................. 370/418 |
| 5,276,765 | 1/1994 | Freeman et al. .................... 395/2 |
| 5,511,073 | 4/1996 | Padovani et al. ................... 370/471 |
| 5,544,225 | 8/1996 | Kennedy III, et al. .............. 379/59 |

FOREIGN PATENT DOCUMENTS 64-5133  1/1989  Japan ................................. H04J 3/17

*Primary Examiner*—Douglas W. Olms
*Assistant Examiner*—Shick Hom
*Attorney, Agent, or Firm*—Scully, Scott, Murphy and Presser

[57] ABSTRACT

In a mobile telephone set, a speech coder is provided for converting an analog speech signal to a digital speech signal. A voice activity sensor determining whether the analog speech signal is present or not. A storage level detector determines the amount of a data signal waiting for transmission from a non-telephonic communications apparatus. A switching control logic determines the rate for the speech coder according to the outputs of the voice activity sensor and the storage level detector. When the analog speech signal is present and the amount of the waiting data signal is zero, the data rate is set at a high rate and a digital speech signal from the speech coder is transmitted along with an indication of the high data rate. When the analog speech signal is present and the amount of the waiting data signal is non-zero, the data rate of the speech coder is set at a rate which is lower than the high data rate and is variable in accordance with the amount of the waiting data signal and the digital speech signal from the speech coder and the data signal from the non-telephonic communications apparatus are transmitted along with an indication of the variable data rate. When the analog speech signal is absent and the amount of the waiting data signal is non-zero, the data signal from the apparatus is exclusively transmitted.

9 Claims, 3 Drawing Sheets

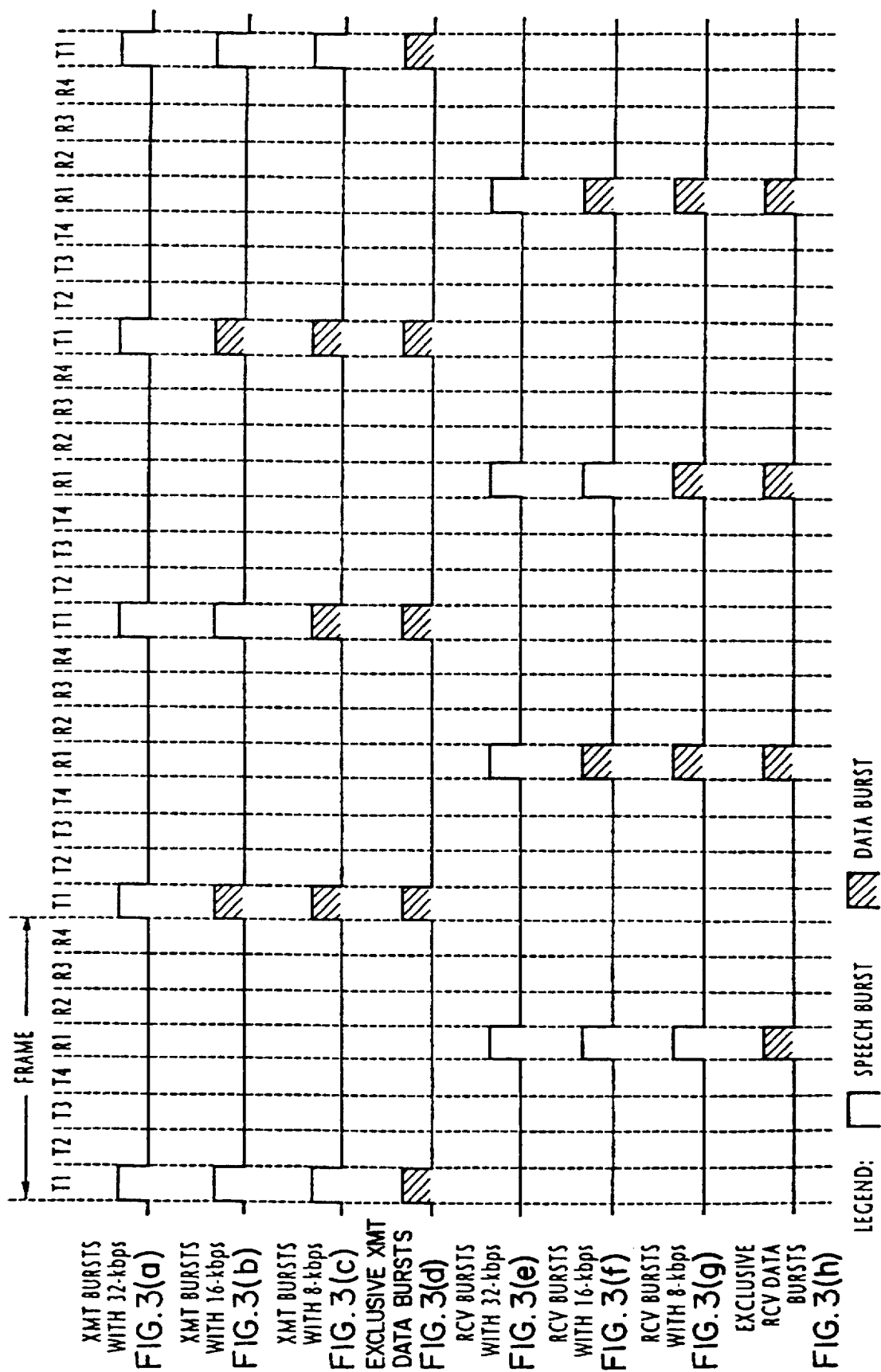

TELEPHONE APPARATUS FOR MULTIPLEXING DIGITAL SPEECH SAMPLES AND DATA SIGNALS USING VARIABLE RATE SPEECH CODING

BACKGROUND OF THE INVENTION

1. Field of the Invention

The present invention relates generally to techniques for simultaneous transmission of data and speech signals over a common channel, and more a specifically to a telephone set to which a non-telephonic communications apparatus is connected for simultaneously sending a data signal and a digital speech signal. The invention is particularly suitable for a mobile station of a time-division multiplex mobile communications system.

2. Description of the Related Art

In digital mobile telephone systems, mobile-to-base links can also be used for transmission of computer-generated data by coupling a device known as "modem" to a mobile telephone set. During a data transmission mode, however, no speech communication is possible. Since simultaneous transmission capability of speech and data signals from a user station is found to be very convenient and useful, the implementation of this concept has been desired. One approach is to use a voice inactivity sensor as described in Japanese Provisional Patent Publication Sho-64-5133. The disclosed voice inactivity sensor monitors the level of a user's speech signal and produces an output in the absence of the user's speech activity. In the presence of this sensor output, a data signal is allowed for transmission.

However, the amount of time allowed for data transmission is significantly limited because of the design principle of the mobile telephone system which is based on a somewhat redundant use of channel resource.

SUMMARY OF THE INVENTION

It is therefore an object of the present invention to provide a telephone set which permits simultaneous transmission of speech and data signals by time-division multiplexing data packets with digital speech samples encoded at a rate lower than a rate at which they are encoded in the absence of data signal.

According to a first aspect of the present invention, there is provided a method for transmitting a digital speech signal and a data signal from a telephone set, the telephone set including a speech coder which produces the digital speech signal at a variable rare from an analog speech signal, the method comprising the steps of:

a) determining whether a data request is present or absent, the data request indicating that a non-telephonic communications apparatus has a data signal to transmit, b) determining whether the analog speech signal is present or absent;

c) if the data request is determined to be absent and the analog speech signal is determined to be present, operating the speech coder at a high data rate, and exclusively transmitting the digital speech signal to a destination along with an indication of the high data rate;

d) if the data request and the analog signal are determined to be simultaneously present, operating the speech coder at a low data rate and interleaving the digital speech signal and the data signal and transmitting the interleaved signals to the destination along with an indication of the low data rate; and e) if the data request is determined to be present and the analog speech signal is determined to be absent, exclusively transmitting the data signal to the destination.

According to a second aspect, the present invention provides a method for transmitting a digital speech signal and a data signal from a mobile telephone set, the telephone set including a speech coder which produces the digital speech signal at a variable rate from an analog speech signal, the telephone set being adapted to be coupled to a non-telephonic communications apparatus which produces a data signal, the method comprising the steps of:

a) determining an amount of the data signal waiting for transmission;

b) determining whether the analog speech signal is present or absent;

c) if the amount of the data signal is determined to be zero and the analog speech signal is determined to be present, operating the speech coder at a high data rate and exclusively transmitting the digital speech signal to a destination along with an indication of the high data rate;

d) if the amount of the data signal is determined to be non-zero and the analog signal is determined to be present, operating the speech coder at a data rate variable in accordance with the determined amount of the data signal, interleaving the digital speech signal and the data signal and transmitting the interleaved signals to the destination along with an indication of the variable data rate; and e) if the amount of the data signal is determined to be non-zero and the analog speech signal is determined to be absent, exclusively transmitting the data signal to the destination.

BRIEF DESCRIPTION OF THE DRAWINGS

The present invention will be described in further detail with reference to the accompanying drawings, in which:

FIG. 3 is a timing diagram for illustrating transmit and receive bursts for different modes of operation.

DETAILED DESCRIPTION

Figure 1:
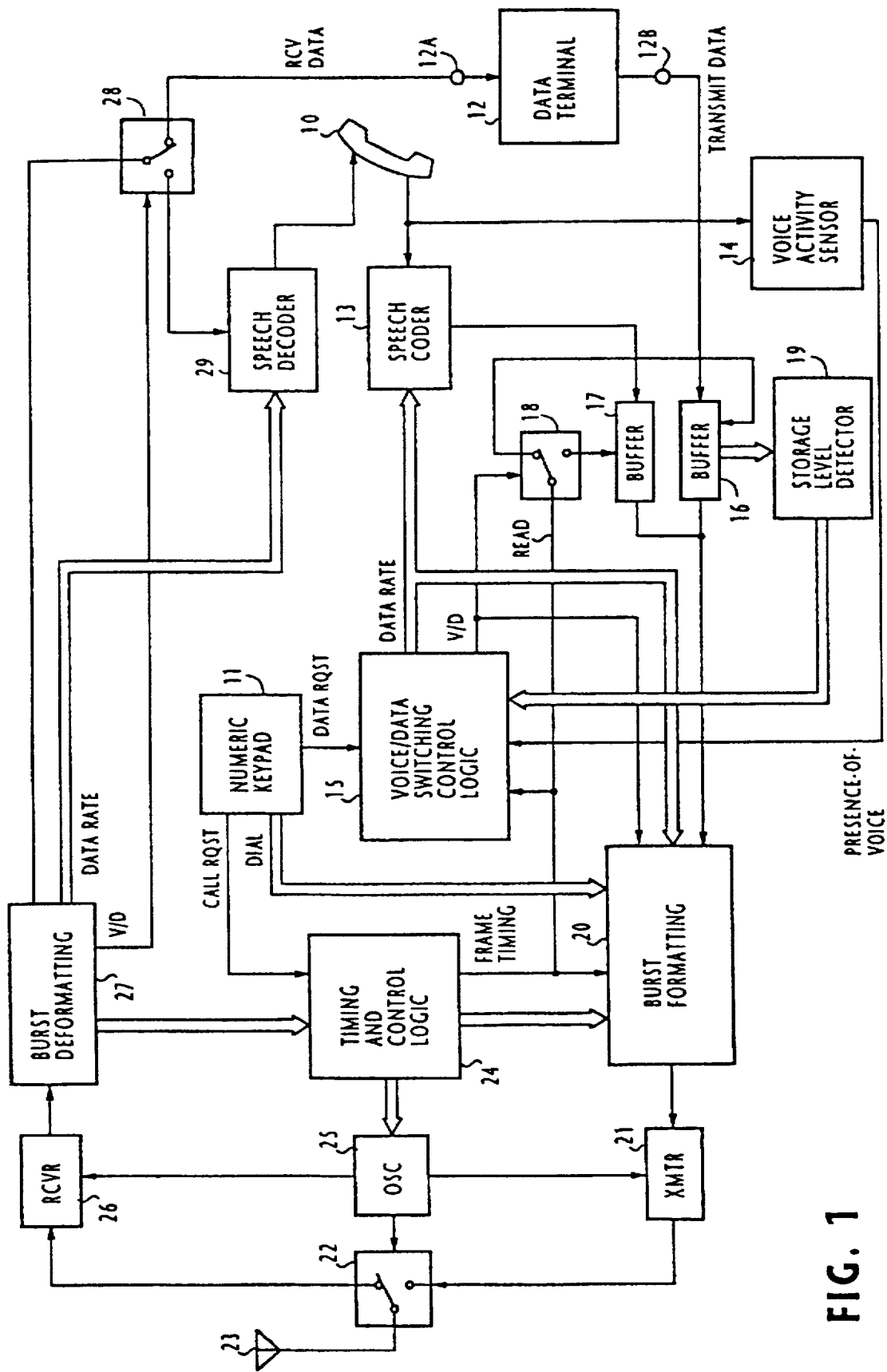
FIG. 1 is a block diagram of a mobile unit for a digital radio communications system such as time division multiple access (TDMA)/time division duplex (TDD) system.

Referring now to FIG. 1, there is shown a mobile telephone set for a digital radio communications system. For the purpose of disclosure, the system will be described as a cellular mobile communications system in which the time division multiple access/time division duplex (TDMA/TDD) principle is employed, i.e., a single frequency is used for transmission of base-to-mobile signals on forward channels and mobile-to-base signals on reverse channels by the use of a high-speed transmit/receive switch 22.

The telephone set generally includes a timing and control logic 24, a burst formatting circuit 20 and a burst deformatting circuit 27. Control logic 24 has the ability to search through the spectrum of radio frequencies allocated to the mobile communications system when a call request is supplied from a push-button numeric keypad 11 and selects an idle time slot. This is done by controlling a synthesizer and oscillator 25 to sequentially scan across the system's frequency spectrum and causing a receiver 26 to demodulate a base-to-mobile burst received via antenna 23 and switch 22 with a synthesized frequency. Burst deformatting circuit 27 includes a bit timing recovery circuit to recover the transmitted bit timing information and a burst synchronizer for establishing synchronism with the base station.

Figure 2:
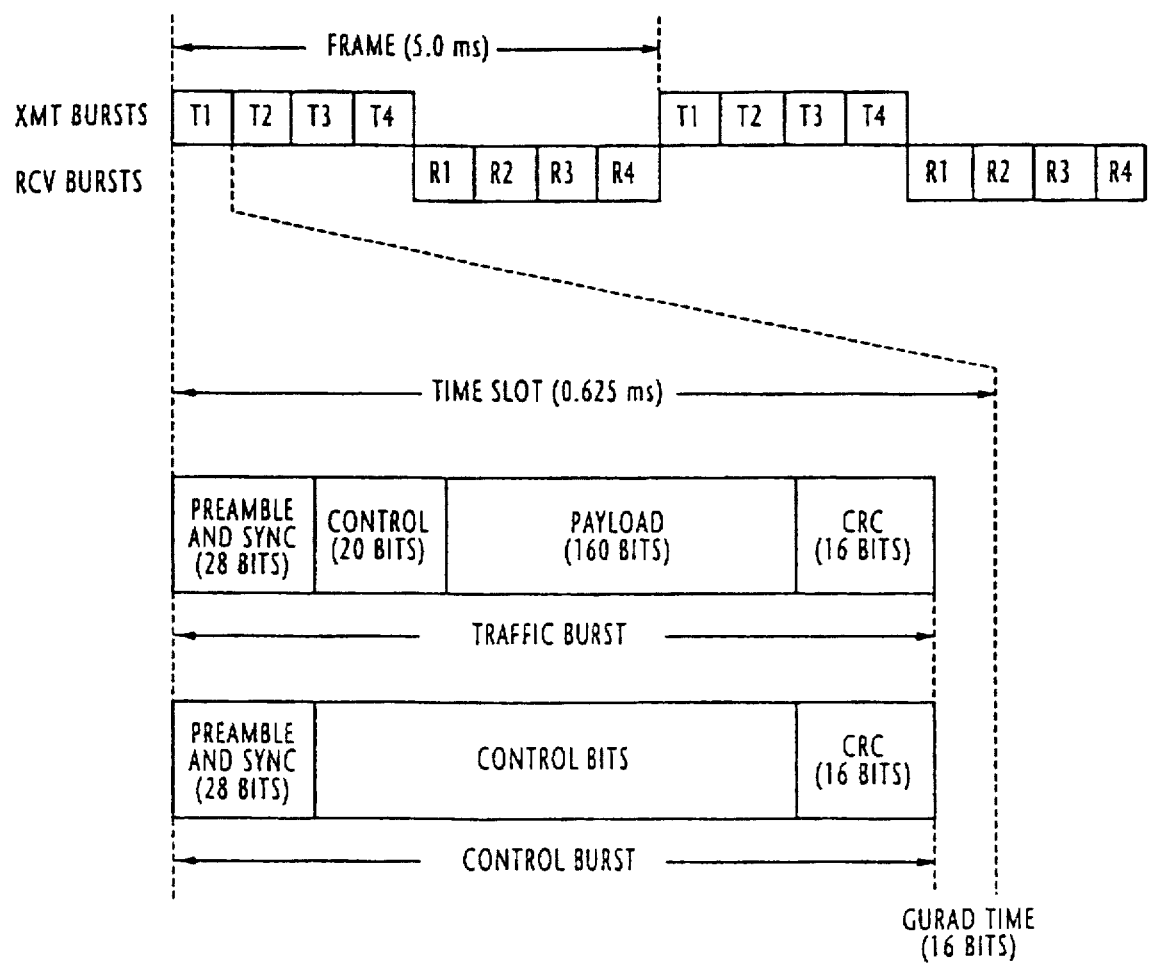
FIG. 2 shows a frame format for accommodating transmit and receive time slots for speech and data traffic.

As illustrated in FIG. 2, the system uses four 0.625-ms duration bursts for mobile-to-base transmission and base-to-mobile transmission. Eight bursts comprise a 5.0-ms frame. Each mobile station uses one of the four transmit time slots and a corresponding receive slot during each frame. Bursts are of two types. One is a control burst comprising a preamble and burst sync field, a control field for carrying control bits and a CRC (cyclic redundancy check) code sequence, and the other is a traffic burst comprising a preamble and burst sync field, a control field, a payload field and a CRC sequence. Each burst is followed by a guard time during which no energy is transmitted to allow the system to operate with unpredictable mobile-to-base arrival times.

During a call establishment period, control data from the base station are extracted by the burst deformatting circuit 27 and supplied to the timing and control logic 24. Using the control data, control logic 24 determines the identify of a time slot and produces a frame timing signal and supplies the time slot identity and the frame timing signal to the burst formatting circuit 20. A destination address is entered through the keypad 11 and supplied to the burst formatting circuit 20. A control burst containing the entered address is formed and applied to a transmitter 21 where it is modulated upon a selected frequency and transmitted via switch 22 from antenna 23 in the selected time slot to the base station. The transmission of the control burst is followed by a procedure in which the base station and the mobile unit cooperate with each other to establish a connection on an idle traffic time slot on one of the allocated frequencies of the system.

According to the present invention, the mobile telephone unit includes a variable rate speech coder 13 and a variable rate speech decoder 29 which are normally constructed and housed in a single module as a speech codec. Speech coder 13 transforms an analog speech signal from the handset 10 into a 4-bit digital signal at one of the rates of 32 kbps, 16 kbps and 8 kbps using the adaptive differential pulse code modulation (ADPCM) technique. Speech decoder 29 transforms a 4-bit digital signal transmitted from a base station at one of the rates of 32 kbps, 16 kbps and 8 kbps into an analog speech signal for coupling to the handset 10. Typically, the variable rate ADPCM speech codec is available from Motorola, Inc. under model MC 145532.

The telephone set has terminals 12A and 12B for coupling to a non-telephonic communications apparatus, or data terminal 12 such as a facsimile machine, a lap-top or desk-top computer and the like. When the data terminal has a signal to transmit, the user operates the keypad 11 to place a data request to a voice/data switching control logic 15.

The outputs of data terminal 12 and speech coder 13 are stored in buffers 16 and 17, respectively. The frame timing signal from the timing and control logic 24 is supplied to the buffers 16, 17 as a read enable signal via a switch 18 to read out a speech packet of 160 bits (=4 bits×40 samples) of digital speech samples or a data packet of 160 data bits into the burst formatting circuit 20 where they are assembled into the payload field of a traffic burst.

A voice activity sensor 14 is connected to the handset transmitter output to supply a presence-of-voice signal to the switching control logic 15 when the user is active in conversation. For operating the speech coder 13 at variable rates, a storage level detector 19 is connected to the data buffer 16 to determine the amount of data waiting in a queue for transmission and supplies the voice/data switching control logic 15 with a signal indicative of this amount. The storage level detector 19 produces a low-level and a high-level signal when the data buffer 16 is filled to low and high levels, respectively.

In the absence of data request signal, the control logic 15 operates the speech coder 13 with a 32-kbps data rate so that speech bursts each containing 160 bits of speech samples are transmitted at 5 ms intervals as illustrated in part (a) of FIG. 3. If a presence-of-voice signal and a data request signal occur simultaneously, the control logic 15 recognizes that the telephone set must operate in a dual mode and modifies the data rate of the speech coder 13 according to the output of the storage level detector 19 and produces a voice/data switching pulses for operating the switch 18 in a manner to be described.

The burst formatting circuit 20 is supplied with a data rate indication and a data indication from the voice/data switching control logic 15 and produces a speech burst by inserting a decoder's data rate into the control field of the speech burst and produces a data burst by inserting a data indication into the control field of the data burst.

If the storage level detector 19 produces a low-level output, the switching control logic 15 alters the data rate to 16 kbps and produces a voice switching pulse (V/D=1) and a data switching pulse (V/D=0) at alternate frame intervals. As a result, the speech coder 13 produces its output at the rate of 16 kbps and the switch 18 is operated for coupling the read enable signal to the speech and data buffers at alternate frame intervals, and speech bursts and data burst are alternately transmitted at 10 ms intervals as illustrated in part (b) of FIG. 3.

If the storage level detector 19 produces a high-level output, the switching control logic 15 alters the data rate to 8 kbps and produces one voice switching pulse (V/D=1) at every four frame intervals and three data switching pulses (V/D=0) at three consecutive frame intervals. As a result, the speech coder 13 produces its output at the rate of 16 kbps and the switch 18 is operated for coupling the read enable signal to the speech buffer 17 once for every four frame intervals and to the data buffer 16 during the intervening frame intervals. As a result, speech bursts are transmitted at 20 ms intervals and data bursts are transmitted during consecutive three frames as illustrated in part (c) of FIG. 3.

If there is no speech transmission, the output of voice activity sensor 14 is zero and the switching control logic 15 continuously produces data switching pulses (V/D=0) to forward 160-bit data packets from buffer 16 into the burst formatting circuit 20 at every frame intervals as shown in part (d) of FIG. 3.

On receiving a speech burst from a base station, the burst deformatting circuit 27 extracts a data rate indication from the control field of the burst and supplies a voice/data switching pulse to the switch 28 and the extracted data rate indication to speech decoder 29. When the data rate indication is 32 kbps, a voice switching pulse is produced for coupling the payload bits of the speech burst to the speech decoder 29 and the latter is operated at the 32-kbps rate as illustrated in part (e) of FIG. 3. When the data rate indication is 16 kbps, the payload bits of the burst are connected to the speech decoder 29 which is operated at 16 kbps as illustrated in part (f) of FIG. 3. When the data rate indication is 8 kbps, the payload bits of the burst decoded at 8 kbps as illustrated in part (g) of FIG. 3.

If the type-of-signal indication of a burst is "data", the payload bits of the received burst is supplied to the data terminal 12 during time slots marked by hatching as shown in parts (f), (g) and (h) of FIG. 3.

It is seen that the present invention allows a situation in which a first party of a telephone communication is active in sending his speech while the second party is keeping silent but sending a data signal. In this case, the speech signal of the first party is sent at 32 kbps rate as shown in part (a) of FIG. 3, while the data signal from the second party is sent using all time slots as illustrated in part (d) of FIG. 3. If the second party begins a speech activity while the data signal is being transmitted, voice activity sensor 14 provides an output to the switching control logic 15 to set a data rate for the speech coder 13 using the amount of data waiting for transmission in the data buffer 16. The speech samples of the second party are interleaved with data packets using time slots marked by hatching as shown in part (b) or (c) of FIG. 3 depending on the amount of the waiting data.

While mention has been made of an embodiment in which the present invention is incorporated in a TDMA/TDD mobile communications system, various modifications and alterations are apparent to those skilled in the art without departing from the scope of the present invention which is only limited by the appended claims.

What is claimed is:

1. A method for transmitting a digital speech signal and a data signal from a telephone set, the telephone set including a speech coder which produces said digital speech signal at a variable rate from an analog speech signal, the method comprising the steps of:

a) determining whether a data request is present or absent, said data request indicating that a non-telephonic communications apparatus has said data signal to transmit;

b) determining whether said analog speech signal is present or absent;

c) if said data request is determined to be absent and said analog speech signal is determined to be present, operating said speech coder exclusively at a high data rate, and exclusively transmitting said digital speech signal to a destination along with an indication of the high data rate;

d) if said data request and said analog speech signal are determined to be simultaneously present, operating said speech coder at a low data rate and interleaving said digital speech signal and said data signal and transmitting the interleaved signals to said destination along with an indication of the low data rate; and e) if said data request is determined to be present and said analog speech signal is determined to be absent, exclusively transmitting said data signal to said destination.

2. A method for transmitting a digital speech signal and a data signal from a telephone set, the telephone set including a speech coder which produces said digital speech signal at a variable rate from an analog speech signal, said telephone set being adapted to be coupled to a non-telephonic communications apparatus which produces a data signal, the method comprising the steps of:

a) determining an amount of said data signal waiting for transmission;

b) determining whether said analog speech signal is present or absent;

c) if the amount of said data signal is determined to be zero and said analog speech signal is determined to be present, operating said speech coder exclusively at a high data rate and exclusively transmitting said digital speech signal to a destination along with an indication of the high data rate;

d) if the amount of said data signal is determined to be non-zero and said analog speech signal is determined to be present, operating said speech coder at a data rate variable in accordance with the determined amount of said data signal, interleaving said digital speech signal and said data signal and transmitting the interleaved signals to said destination along with an indication of the variable data rate; and e) if the amount of said data signal is determined to be non-zero and said analog speech signal is determined to be absent, exclusively transmitting said data signal to said destination.

3. A communication method for a telephone set, the telephone set including a variable rate speech coder for converting an analog speech signal to a digital speech signal at a variable data rate and a variable rate speech decoder, the method of comprising the steps of:

a) determining whether a data request is present or absent, said data request indicating that a non-telephonic communications apparatus has said data signal to transmit;

b) determining whether said analog speech signal is present or absent;

c) storing the digital speech signal in a speech buffer;

d) storing said data signal from said non-telephonic communications apparatus in a data buffer;

e) if said analog speech signal is determined to be present and said data request is determined to be absent, operating said speech coder exclusively at a high data rate, exclusively reading said digital speech signal from the speech buffer, and transmitting to a destination a speech burst containing the read digital speech signal and an indication of said high data rate;

f) if said analog speech signal is determined to be present and said data request is determined to be present, operating said speech coder at a low data rate, reading said digital speech signal and a data signal from the speech and data buffers, transmitting to said destination a speech burst containing the read digital speech signal and an indication of said low data rate and a data burst containing the read data signal interleaved with the speech burst, said variable data rate being lower than said high data rate;

g) if said analog speech signal is determined by step (b) to be absent and said data request is determined to be present, exclusively reading said data signal from the data buffer and transmitting to said destination said data burst containing the read data signal; and h) receiving said data burst from the destination and identifying the received burst as a speech burst or a data burst, and supplying said digital speech signal contained in the speech burst to the speech decoder and operating the speech decoder at a rate corresponding to the data rate indication contained in the speech burst, and supplying said data signal contained in the data burst to said non-telephonic communications apparatus.

4. A communication method for a telephone set, the telephone set including a variable rate speech coder for converting an analog speech signal to a digital speech signal at a variable rate and a variable rate speech decoder, said telephone set being adapted for connection for a non-telephonic communications apparatus having a data signal to transmit, the method comprising the steps of:

a) determining whether said analog speech signal is present or absent;

b) storing digital speech signals in a speech buffer;

c) storing data signals from said non-telephonic communications apparatus in a data buffer;

d) determining an amount of said data signals stored in said data buffer and producing a stored data signal indicative thereof;

e) if said analog speech signal is determined to be present and the amount of the stored data signal is determined to be zero, operating said speech coder exclusively at a high data rate, reading the digital speech signal from the speech buffer and transmitting to a destination a speech burst containing the read digital speech signal and an indication of said high data rate;

f) if said analog speech signal is determined to be present and the amount of said stored data signal is determined to be non-zero, operating said speech coder at a variable data rate according to the amount of said stored data signal, reading said digital speech signals and said data signals from the speech and data buffers, transmitting to said destination a speech burst containing the read digital speech signal and an indication of the variable data rate and a data burst containing the read data signal interleaved with the speech burst, said variable data rate being lower than said high data rate;

g) if said analog speech signal is determined to be absent and the amount of said stored data is determined to be non-zero, exclusively reading the data signal from the data buffer and transmitting to said destination a data burst containing the read data signal; and h) receiving a burst from the destination and identifying the received burst as a speech burst or a data burst, and supplying said digital speech signal contained in the speech burst to the speech decoder and operating the speech decoder at a rate corresponding to the data rate indication contained in the speech burst, and supplying said data signals contained in the data burst to said non-telephonic communications apparatus.

5. A telephone set comprising:

a data input terminal and a data output terminal to which a non-telephonic communications apparatus is adapted to be connected;

entry means for entering a data request when said apparatus has a data signal to transmit;

a speech coder for converting an analog speech signal to a digital speech signal at a variable rate;

a voice activity sensor for determining whether said analog speech signal is present or absent; and control means for (a) operating said speech coder exclusively at a high data rate when said analog speech signal is determined to be present while no data request is entered through said entry means and exclusively transmitting the digital speech signal from the speech coder along with an indication of the high data rate, (b) operating said speech coder at a low data rate when said analog speech signal is determined to be present while a data request is entered through said entry means, transmitting the digital speech signal from the speech coder and said data signal from the non-telephonic communications apparatus along with an indication of the low data rate, and (c) exclusively transmitting the data signal from said apparatus when said analog speech signal is determined to be absent.

6. A telephone set comprising:

a data input terminal and a data output terminal to which a non-telephonic communications apparatus is adapted to be connected;

a speech coder for converting an analog speech signal to a digital speech signal at a variable rate;

a voice activity sensor for determining whether said analog speech signal is present or absent;

a storage level detector for determining an amount of a data signal waiting for transmission from said non-telephonic communications apparatus; and control means for (a) operating said speech coder exclusively at a high data rate when said analog speech signal is determined to be present and the detected amount of said data signal is zero and exclusively transmitting said digital speech signal from the speech coder along with an indication of the high data rate, (b) operating said speech coder at a variable data rate lower than said high data rate in accordance with the detected amount of said data signal when said analog speech signal is determined to be present and said detected amount of the data signal is non-zero, transmitting the digital speech signal from the speech coder and the data signal from the non-telephonic communications apparatus along with an indication of the variable data rate, and (c) exclusively transmitting the data signal from said apparatus when said analog speech signal is determined to be absent and said detected amount of the data signal is non-zero.

7. A telephone set for a mobile communications system, comprising:

a data input terminal and a data output terminal to which a non-telephonic communications apparatus is adapted to be connected;

entry means for entering a data request when said apparatus has a data signal to transmit;

a speech coder for converting an analog speech signal to a digital speech signal at a variable rate;

a voice activity sensor for determining whether said analog speech signal is present or absent;

a speech buffer for storing digital speech signals supplied from said speech coder;

a data buffer for storing data signals from said data input terminal;

receiver means for detecting a burst from a base station;

timing control means for determining frame intervals from the burst detected by the receiver means;

switching control means for (a) operating said speech coder exclusively at a high data rate when said analog speech signal is determined to be present simultaneously while no data request is entered through said entry means and exclusively reading digital speech signals from the speech buffer, (b) operating said speech coder at a low data rate when said analog speech signal is determined to be present while said data request is entered through said entry means and selectively reading said digital speech signal and said data signal from the speech and data buffers (c) exclusively reading said data signals from the data buffer when said analog speech signal is determined to be absent;

burst formatting means for producing, at the determined frame intervals, a speech burst from said digital speech signal and a data burst from said data signal respectively read by said switching control means, said speech burst containing an indication of the data rate of said speech coder;

transmitter means for transmitting the speech and data bursts to said base station;

a speech decoder for converting said digital speech signal to an analog speech signal at a variable rate; and burst deformatting means for identifying the burst detected by the receiver means as said speech burst or said data burst, supplying said digital speech signal contained in the speech burst to the speech decoder and operating the speech decoder at a rate corresponding to the data rate indication contained in the speech burst, and supplying said data signal contained in the data burst to said data output terminal.

8. The telephone set as claimed in claim 7, further comprising a storage level detector for detecting an amount of said data signals stored in the data buffer and producing an output signal indicative of the detected amount, wherein said switching control means is responsive to the output signal of the storage level detector for operating said speech coder at a rate variable in accordance with the detected amount of said data signals stored in said data buffer.

9. A telephone set for a mobile communications system, comprising:

- a data input terminal and a data output terminal to which a non-telephonic communications apparatus is adapted to be connected;
- a speech coder for converting an analog speech signal to a digital speech signal at a variable rate;
- a voice activity sensor for determining whether said analog speech signal is present or absent;
- a speech buffer for storing digital speech signals supplied from said speech coder;
- a data buffer for storing data signals from said data input terminal;
- receiver means for detecting a burst from a base station;
- timing control means for determining frame intervals from the burst detected by the receiver means;
- a storage level detector for detecting an amount of the data signals stored in the data buffer;
- switching control means for (a) operating said speech coder exclusively at a high data rate when said analog speech signal is determined to be present and the detected amount of the data signals is zero and exclusively reading digital speech signals from the speech buffer, (b) operating said speech coder at a variable data rate lower than said high data rate depending on the detected amount of the data signals when said analog speech signal is determined to be present and the detected amount of the data signals is non-zero, and reading said digital speech signal and said data signals from the speech and data buffers at different frame intervals in accordance with said lower variable data rate, and (c) exclusively reading the data signals from the data buffer when said analog speech signal is determined to be absent and the detected amount of the data signals is non-zero;
- burst formatting means for producing, at the determined frame intervals, a speech burst from a digital speech signal and a data burst from data signals respectively read by said switching control means, said speech burst containing a data rate indication indicating the rate at which said speech coder is operated;
- transmitter means for transmitting the speech and data bursts to said base station;
- a speech decoder for converting said digital speech to said analog speech signal at a variable rate; and
- burst deformatting means for identifying the burst detected by the receiver means as a speech burst or a data burst, supplying said digital speech signal contained in said speech burst to the speech decoder and operating the speech decoder at a rate corresponding to the data rate indication contained in the speech burst, and supplying said data signals contained in the data burst to said data output terminal.

* * * * *

UNITED STATES PATENT AND TRADEMARK OFFICE
CERTIFICATE OF CORRECTION

PATENT NO. : 5,754,554
DATED : May 19, 1998
INVENTOR(S) : Toru Nakahara

It is certified that error appears in the above-identified patent and that said Letters Patent is hereby corrected as shown below:

Column 1, Line 49: "rare should read --rate--

Column 4, Line 29; "16" should read --8--

Column 4, Line 50: "intervals--interval--

Signed and Sealed this

Eighteenth Day of July, 2000

Attest:

Q. TODD DICKINSON

*Attesting Officer*          *Director of Patents and Trademarks*